US011933327B2

(12) United States Patent
Guo et al.

(10) Patent No.: US 11,933,327 B2
(45) Date of Patent: Mar. 19, 2024

(54) HYDRAULIC ACTUATOR WITH NO FRICTION AND ZERO LEAKAGE, AND ITS DRIVE SYSTEM

(71) Applicant: Shandong University, Jinan (CN)

(72) Inventors: Kai Guo, Jinan (CN); Wei He, Jinan (CN); Jie Sun, Jinan (CN); Mingjian Sun, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/206,625

(22) Filed: Jun. 7, 2023

(65) Prior Publication Data

US 2024/0060516 A1 Feb. 22, 2024

(30) Foreign Application Priority Data

Aug. 16, 2022 (CN) ......................... 202210978523.8

(51) Int. Cl.
*F15B 11/08* (2006.01)
*F15B 13/02* (2006.01)

(52) U.S. Cl.
CPC ............ *F15B 11/08* (2013.01); *F15B 13/024* (2013.01)

(58) Field of Classification Search
CPC .. F15B 15/10; F15B 13/04; F15B 2211/7052; F15B 2215/30; B23Q 1/26; B23Q 5/26
See application file for complete search history.

(56) References Cited

U.S. PATENT DOCUMENTS 3,046,006 A * 7/1962 Kulicke, Jr. ........... B23Q 1/262 248/913
4,884,003 A 11/1989 Hayes
5,265,491 A * 11/1993 Nishiumi ............... B23Q 1/626 74/89.41
5,760,500 A * 6/1998 Kondo ................... H02K 41/02 310/12.21
6,612,223 B2 * 9/2003 Leonard .................... B66F 3/35 92/96
7,603,943 B2 * 10/2009 Haas ..................... F15B 15/149 92/110
11,731,225 B1 * 8/2023 Guo ......................... B23Q 1/26 269/20

FOREIGN PATENT DOCUMENTS

| | | | |
|---|---|---|---|
| CN | 1693028 | A | 11/2005 |
| CN | 104792446 | A | 7/2015 |
| CN | 106357151 | A | 1/2017 |
| CN | 111590367 | A | 8/2020 |

* cited by examiner

*Primary Examiner* — Thomas E Lazo
(74) *Attorney, Agent, or Firm* — Jose Cherson Weissbrot

(57) ABSTRACT

A hydraulic actuator with no friction and zero leakage and its drive system are provided. The hydraulic actuator includes a thickened disc structure A and a thickened disc structure B. The second end face of the thickened disc structure A is connected with the first end face of the thickened disc structure B, and a control cavity is formed between the second end face of the thickened disc structure A and the first end face of the thickened disc structure B. The drive oil access hole is arranged on the thickened disc structure B, and the control cavity is connected with the drive oil access hole. The displacement output method based on elastic deformation is adopted, which completely avoids the nonlinear phenomena such as leakage and friction, and reduces the difficulty of high-precision control of the actuator.

16 Claims, 5 Drawing Sheets

A-A

HYDRAULIC ACTUATOR WITH NO FRICTION AND ZERO LEAKAGE, AND ITS DRIVE SYSTEM

CROSS REFERENCE TO THE RELATED APPLICATIONS

This application is based upon and claims priority to Chinese Patent Application No. 202210978523.8, filed on Aug. 16, 2022, the entire contents of which are incorporated herein by reference.

TECHNICAL FIELD

The present invention relates to the technical field of hydraulic actuators, in particular to a hydraulic actuator with no friction and zero leakage, and its drive system.

BACKGROUND

The statement here only provides background technical information related to the invention, which does not necessarily constitute prior technology.

The hydraulic actuator is an important component of the fluid transmission and control system, which is responsible for the important task of converting hydraulic energy into mechanical energy and doing work outside. Traditional hydraulic actuators are mainly divided into seal ring hydraulic actuators, clearance seal hydraulic actuators, and artificial muscle hydraulic actuators based on axial deformation.

The seal ring hydraulic actuator uses seals to separate the high and low-pressure oil chambers, this structure causes leakage between the high and low-pressure oil chambers of the actuator, at the same time, the use of seals introduces nonlinear characteristics such as friction and hysteresis, which leads to the phenomenon of crawling and creeping in the closed-loop control of the seal ring hydraulic actuator, which seriously affects the dynamic performance and the position control accuracy of the hydraulic actuator. At the same time, the friction pair is prone to wear and burn under high-frequency working conditions, which cannot meet the requirements of high frequency and high precision displacement and force control.

The clearance seal hydraulic actuator ensures the clearance of the motion pair by improving the machining accuracy. Compared with the sealing actuator, the friction of the motion pair is reduced to a certain extent, and the frequency response of the actuator is improved. However, the clearance seal causes a large leakage of the motion pair, especially in the case of high pressure, the leakage increases significantly, the efficiency decreases rapidly, and the heating phenomenon becomes serious, which seriously affects the efficiency of the hydraulic system and the accuracy of static position control.

The artificial muscle hydraulic actuator is composed of a rubber cylinder wrapped with a steel wire woven net. It is usually driven by hydraulic oil and has the characteristics of a simple structure. However, because it relies on the radial deformation of the cylinder wall of the actuator to achieve the output of the axial displacement, it is usually necessary to increase the axial size of the actuator in proportion to achieve a larger axial displacement, which cannot meet the application of limited axial size. In addition, soft materials such as rubber have the inherent nonlinear characteristics of hysteresis and creep, etc., and the reduction of lateral stiffness caused by large axial size limits its application in high stiffness, high-frequency response, and high precision occasions.

In summary, the use of the seal ring hydraulic actuator will introduce the friction of the motion pair, resulting in nonlinear phenomena such as crawling and creeping, and the control accuracy is difficult to improve; the clearance seal of the clearance seal hydraulic actuator leads to a significant increase in leakage at high pressure, which reduces the system efficiency, and the machining accuracy of the clearance seal is high. The use of the artificial muscle hydraulic actuator will significantly increase the axial installation space of the actuator, and its lateral stiffness is low and the hysteresis is large, which is not suitable for large output force and high precision displacement/force control occasions. Therefore, it is of great significance to overcome the nonlinear control problems such as crawling and creeping caused by the inherent leakage and friction of the traditional hydraulic actuators, reduce the axial size of the hydraulic actuators, improve its stroke-axis size ratio, and achieve high-frequency response and high-precision displacement/force control in the case of limited axial size.

SUMMARY

To solve the above problems, the present invention proposes a hydraulic actuator with no friction and zero leakage, and its drive system, which has the advantages of simple structure, low cost, small axial size, high stiffness, no friction, zero leakage, etc., and can achieve high-frequency and high-precision displacement and force control in the case of limited axial installation space.

To achieve the above purpose, the present invention adopts the following technical scheme:

In the first aspect, a hydraulic actuator with no friction and zero leakage is proposed, including a thickened disc structure A and a thickened disc structure B. The second end face of the thickened disc structure A is connected to the first end face of the thickened disc structure B, and a control cavity is formed between the second end face of the thickened disc structure A and the first end face of the thickened disc structure B. A drive oil access hole is set on the thickened disc structure B, and the control cavity is connected with the drive oil access hole.

In the second aspect, the hydraulic actuator with no friction and zero leakage is proposed, including disc actuator I and disc actuator II. Both disc actuator I and disc actuator II include a thickened disc structure A and a thickened disc structure B. The second end face of the thickened disc structure A is connected to the first end face of the thickened disc structure B, and a control cavity is formed between the second end face of the thickened disc structure A and the first end face of the thickened disc structure B. The control cavity of the disc actuator I is connected to the control cavity of the disc actuator II, and a drive oil access hole is set on the thickened disc structure B of the disc actuator II. The drive oil access hole is connected with the control cavity of the disc actuator II.

In the third aspect, a drive system for the hydraulic actuator with no friction and zero leakage is proposed, including a controller, a hydraulic pump, a proportional valve, relief valves, a plurality of pressure sensors, and a plurality of hydraulic actuators with no friction and zero leakage disclosed in the first aspect. The hydraulic pump is connected to the oil inlet of the proportional valve, and the oil outlet of the proportional valve is connected to the drive oil access holes of the hydraulic actuators with no friction and zero leakage, respectively. The relief valves are set on the connection pipeline between the hydraulic pump and the oil inlet, and the connection pipeline between the oil outlet and the drive oil access hole. The proportional valve and the pressure sensors are connected to the controller. The pressure sensors are used to obtain the control cavity pressure of each hydraulic actuator with no friction and zero leakage. The controller is used to calculate the output displacement of the hydraulic actuators with no friction and zero leakage according to the control cavity pressure. The output displacement is compared with the commanded displacement to obtain the control signal. The proportional valve is controlled by the control signal.

In the fourth aspect, the drive system for the hydraulic actuator with no friction and zero leakage is proposed, including a controller, a hydraulic pump, a proportional valve, relief valves, a plurality of pressure sensors, and hydraulic actuators with no friction and zero leakage disclosed in the second aspect. The hydraulic pump is connected with the inlet of the proportional valve, and the outlet of the proportional valve is connected with the drive oil access holes of the hydraulic actuators with no friction and zero leakage. The relief valves are set on the connection pipeline between the hydraulic pump and the inlet, and the connection pipeline between the outlet and the drive oil access hole. The pressure sensors are used to obtain the pressure in the control cavity of each hydraulic actuator with no friction and zero leakage. The controller is used to calculate the output displacement of the hydraulic actuators with no friction and zero leakage according to the pressure in the control cavity. The output displacement is compared with the commanded displacement to obtain the control signal, and the proportional valve is controlled by the control signal.

Compared with the existing technology, the beneficial effects of the present invention are as follows:

The hydraulic actuator described in the present invention outputs an axial displacement based on the elastic deformation of the material, adopts the design of the static seal, and there is no kinematic pair inside the structure, which effectively avoids the inherent friction, leakage, hysteresis, creep and other nonlinear characteristics of the traditional hydraulic actuators, and reduces the difficulty of high-precision displacement and force control.

The second end face of the thickened disc structure A and the first end face of the thickened disc structure B are sealed with a seal ring, which have low machining accuracy requirements and greatly reduce the manufacturing cost. At the same time, there is no motion pair inside the actuator, which has the characteristics of a simple structure and a small axial size.

The stiffness enhanced areas and the stiffness weakening areas are alternately arranged in the thickened disc structure of the hydraulic actuator proposed in the invention. On this basis, the stiffness weakening area size and the stiffness enhanced area size are optimized according to the material stress limit, the stress concentration is limitedly reduced, and the deformation of the disc structure is fully utilized. At the same time, the stiffness of the actuator is designable, and the actuator with different stiffness can be designed to meet different stroke requirements.

The hydraulic actuator drive system proposed by the invention can realize high frequency and high precision displacement and force control of the hydraulic actuators using electro-hydraulic servo control.

The advantages of the additional aspects of the present invention will be partially given in the following description, and some parts will become clear from the following description or will be learned through the practice of the invention.

BRIEF DESCRIPTION OF THE DRAWINGS

The drawings of the specification, which form part of this application, are used to provide a further understanding of this application. The schematic embodiments and descriptions of this application are used to explain this application and do not constitute an improper limitation of this application.

Figure 1:
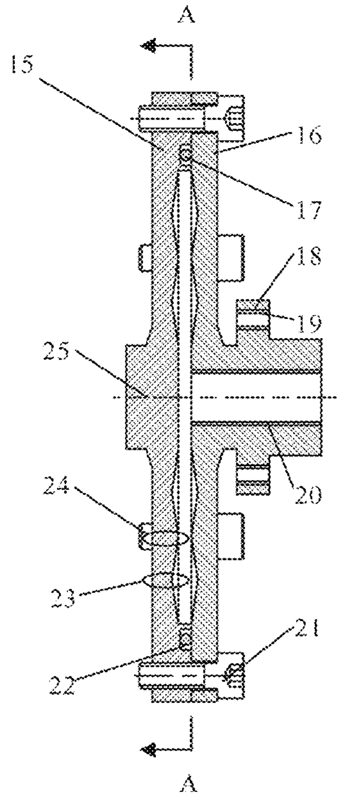
FIG. 1 is the first structural section view of the hydraulic actuator disclosed in Embodiment 1.
Figure 2:
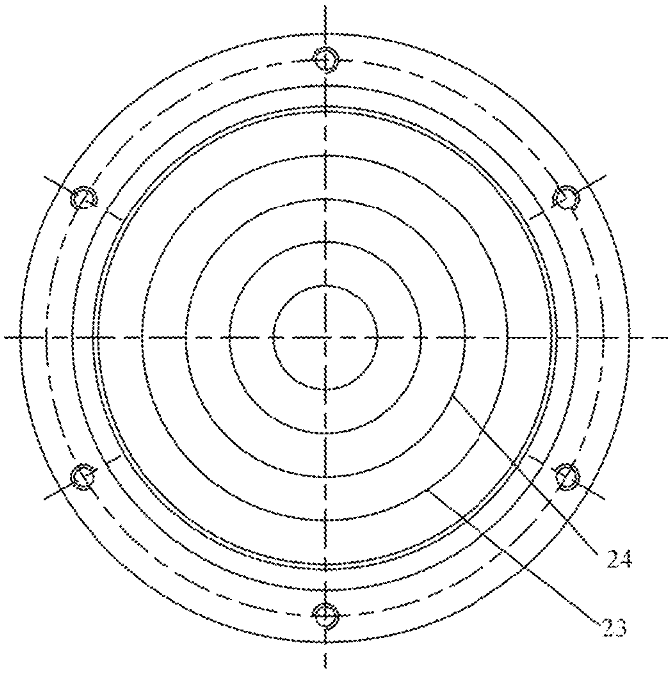
FIG. 2 is the side view of the hydraulic actuator disclosed in Embodiment 1.

Among them: 1, pump station motor; 2, hydraulic pump; 3, relief valve; 4, proportional directional valve; 5, relief valve; 6, relief valve; 7, disc actuator II; 8, fixed bracket II; 9, disc actuator I; 10, fixed bracket I; 11, pressure sensor; 12, pressure sensor; 13, driven platform; 14, controller; 15, the thickened disc structure A; 16, the thickened disc structure B; 17, seal ring; 18, installation flange; 19, flange thread hole; 20, drive oil access hole; 21, connecting screw; 22, seal groove; 23, stiffness weakening area; 24, stiffness enhanced area; 25, convex plate; 26, proportional pressure reducing valve; 27, proportional pressure reducing valve; 28, disc actuator II; 29, disc actuator I; 30, fixed bracket; 31, drive oil access hole; 32, rotating platform; 33, disc actuator I; 34, disc actuator II; 35, fixed ball hinge I; 36, fixed ball hinge II; 37, disc actuator I; 38, disc actuator II; 39, fixed bracket I; 40, disc actuator III; 41, disc actuator IV; 42, fixed bracket II; 43, driven platform, 44, tandem disc actuator I; 45, tandem disc actuator II; 46, fixed bracket H; 47, fixed bracket I; 48, driven platform.

DETAILED DESCRIPTION OF THE EMBODIMENTS

The following is a further explanation of the invention in combination with drawings and embodiments.

It should be noted that the following details are illustrative and are intended to provide further clarification of this application. Unless otherwise indicated, all technical and scientific terms used herein have the same meaning as those commonly understood by ordinary technicians in the technical field to which this application relates.

It should be noted that the terminology used here is only to describe the specific embodiments, it is not intended to limit the examples of the embodiment in this application. As used here, the singular form is also intended to include the plural form unless explicitly stated in the context. In addition, it should be understood that when the terms 'include' and/or 'comprise' are used in this specification, they indicate the presence of features, steps, operations, devices, components, and/or combinations of them.

In this invention, terms such as 'up', 'down', 'left', 'right', 'front', 'back', 'vertical', 'horizontal', 'side', and 'bottom' indicate the position or position relationship based on the position or position relationship shown in the attached figures, which is only a relation word determined to facilitate the description of the structural relationship of any accessory or component of the invention. It does not refer to any accessory or component in the invention and cannot be understood as a restriction on the invention.

In this invention, terms such as 'fixed connection', 'connect', 'link', etc. should be understood in a broad sense, indicating that it can be a fixed connection, an integrated connection, or a detachable connection; it can be directly connected or indirectly connected through an intermediary. For the relevant scientific research or technical personnel in this field, the specific meaning of the above terms in the invention can be determined according to the specific situation, which cannot be understood as a restriction on the invention.

Embodiment 1

In this embodiment, a hydraulic actuator with no friction and zero leakage is disclosed, as shown in FIGS. 1-4, including a thickened disc structure A and a thickened disc structure B. The second end face of the thickened disc structure A is connected with the first end face of the thickened disc structure B, and a control cavity is formed between the second end face of the thickened disc structure A and the first end face of the thickened disc structure B. A drive oil access hole is set on the thickened disc structure B, the control cavity is connected with the drive oil access hole, and the drive oil access hole is connected to the control cavity.

Figure 4:
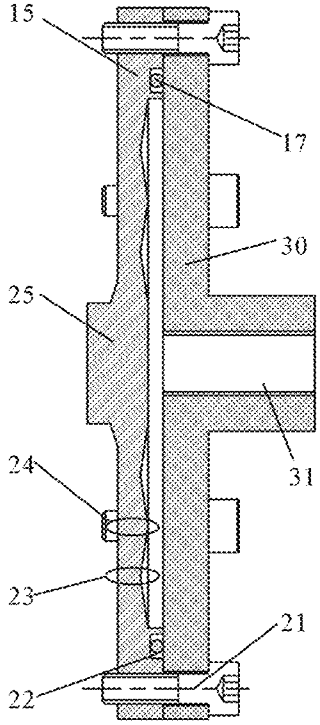
FIG. 4 is the second structural section view of the hydraulic actuator disclosed in Embodiment 1.

As shown in FIG. 1 and FIG. 4, a convex plate 25 is set on the first end face of the thickened disc structure A 15. The convex plate 25 is circular and is located at the center of the thickened disc structure A 15. The displacement of the hydraulic actuator disclosed in this embodiment is output through the convex plate 25, and the installation flange 18 is connected to the second end face of the thickened disc structure B 16. The hydraulic actuator disclosed in this embodiment is fixed with the fixed bracket by installation flange 18, and the installation flange 18 and the fixed bracket are bolted through the flange thread hole 19 for bolt connection.

A drive oil access hole 20 is connected to the high-pressure tube, and the hydraulic oil is introduced into the control cavity by the drive oil access hole 20. Under the action of the hydraulic oil, the thickened disc structure A 15 and the thickened disc structure B16 are elastically deformed so that the displacement can be output.

To ensure the sealing performance of the hydraulic actuator and prevent the oil from leaking, a seal ring 17 is installed between the second end face of the thickened disc structure A 15 and the first end face of the thickened disc structure B 16. Specifically, a seal groove 22 is set on the second end face of the thickened disc structure A 15, and the seal ring 17 is installed in the seal groove 22. The seal ring 17 is used for preventing the hydraulic oil in the control cavity from leaking in the junction of the second end face of the thickened disc structure A 15 and the first end face of the thickened disc structure B16, the optimal choice of the seal ring 17 is an O-ring.

Figure 3:
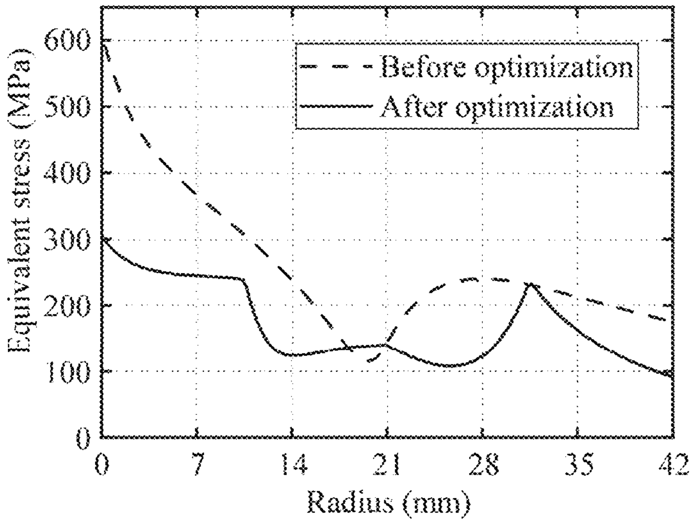
FIG. 3 is the stress curve along the radius direction of the thickened disc structure of the hydraulic actuator disclosed in Embodiment 1.

The thickened disc structure A 15 and the thickened disc structure B 16 include a plurality of stiffness weakening areas 23 and stiffness enhanced areas 24. The stiffness weakening areas 23 and the stiffness enhanced areas 24 are alternately arranged along the radial direction of the thickened disc structure A 15 and the thickened disc structure B 16. By alternately arranging the stiffness enhanced areas 24 and the stiffness weakening areas 23, the stress distribution along the radius direction is optimized, the stress concentration of the thickened disc structure is reduced, and the deformation of the thickened disc structure is fully utilized. As shown in FIG. 3, it is the equivalent stress diagrams of the disc structure along the radius direction of the stiffness enhanced area and the stiffness weakening area alternate one time before optimization, and the stiffness enhanced area and the stiffness weakening area alternate three times after optimization, respectively.

The thickened disc structure A 15 and the thickened disc structure B 16 are connected by a connecting screw 21.

The groove A is set on the second end face of the thickened disc structure A15, and the groove B is set on the first end face of the thickened disc structure B 16. The second end face of the thickened disc structure A 15 is connected with the first end face of the thickened disc structure B 16. The control cavity is formed by the groove A and the groove B. The bottom of the groove A and the bottom of the groove B both include a plurality of stiffness weakening areas and stiffness enhanced areas. The stiffness weakening areas of the groove A and the groove B are set relatively, and the stiffness enhanced areas are set relatively to form a control cavity.

In the specific implementation, the thickened disc structure B can also adopt a fixed bracket 30, and a drive oil access hole 31 connected to the control cavity is set on the fixed bracket 30.

As shown in FIG. 4, groove A is only set on the second end face of the thickened disc structure A. The second end face of the thickened disc structure A is connected with the first end face of the thickened disc structure B. The control cavity is formed by groove A, and a plurality of stiffness weakening areas and stiffness enhanced areas are only set at the bottom of groove A.

The hydraulic actuator with no friction and zero leakage disclosed in this embodiment, for the area of the control cavity between the thickened disc structure A and the thickened disc structure B, as well as the thickness of the stiffness enhanced area and the stiffness weakening area, the number of alternate arrangements should be determined according to the volume limit of the hydraulic actuator disclosed in this embodiment and the mechanical properties of the manufacturing material, and the design of key size parameters should be completed under the condition of ensuring the fatigue strength of the actuator.

The hydraulic actuator with no friction and zero leakage disclosed in this embodiment outputs the axial displacement based on the elastic deformation of the material, adopts the design of a static seal, and there is no motion pair inside the structure, which effectively avoids the inherent friction, leakage, hysteresis, creep and other nonlinear characteristics of the traditional hydraulic actuators, and reduces the difficulty of high-precision displacement and force control. The end face of the static seal is sealed with a seal ring, which has low processing accuracy requirements and greatly reduces manufacturing costs. At the same time, there is no motion pair inside the actuator, which has the characteristics of a simple structure and small axial size.

The stiffness enhanced areas and the stiffness weakening areas are alternately arranged in the thickened disc structure of the actuator. On this basis, the sizes of the stiffness weakening area and the stiffness enhanced area are optimized according to the material stress limit, which reduces the stress concentration and gives full play to the deformation of the disc structure. At the same time, the stiffness of the actuator is designable, and different stiffness actuators can meet different stroke requirements.

Embodiment 2

Figure 5:
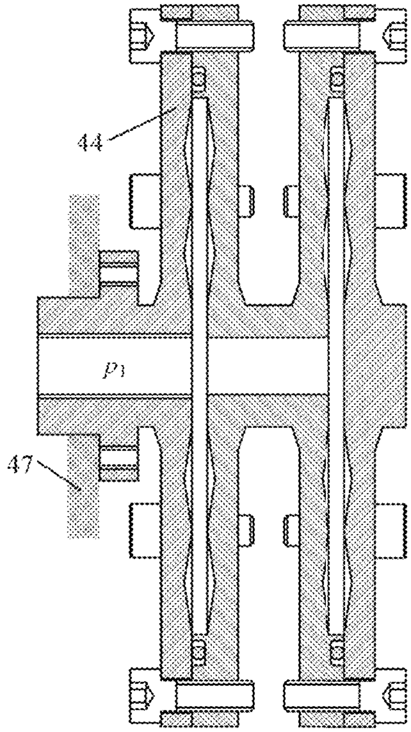
FIG. 5 is the structural profile of the hydraulic actuator disclosed in Embodiment 2.

In this embodiment, a hydraulic actuator with no friction and zero leakage is disclosed as shown in FIG. 5, it is a series disc actuator, including a disc actuator I and a disc actuator II. Both the disc actuator I and the disc actuator II include a thickened disc structure A and a thickened disc structure B. The second end face of the thickened disc structure A is connected to the first end face of the thickened disc structure B, and a control cavity is formed between the second end face of the thickened disc structure A and the first end face of the thickened disc structure B. The control cavity of the disc actuator I is connected to the control cavity of the disc actuator II. The drive oil access hole is set on the thickened disc structure B of the disc actuator I, and the drive oil access hole is connected to the control cavity of the disc actuator I.

A convex platform is set on the first end face of the thickened disc structure A in the disc actuator H, and an installation flange is set on the second end face of the thickened disc structure B in the disc actuator I.

The thickened disc structure A and the thickened disc structure B both include a plurality of stiffness weakening areas and stiffness enhanced areas. The stiffness weakening areas and the stiffness enhanced areas are alternately arranged along the radial direction of the disc actuator I.

The hydraulic actuator with no friction and zero leakage disclosed in this embodiment realizes the series connection of two disc actuators and improves the stroke of the hydraulic actuator.

Embodiment 3

In this embodiment, a drive system for the hydraulic actuator with no friction and zero leakage is shown in FIGS. 6-11, including a controller 14, a hydraulic pump 2, a proportional valve, relief valves, pressure sensors, and a plurality of hydraulic actuators with no friction and zero leakage disclosed in Embodiment 1. The hydraulic pump 2 is connected to the oil inlet of the proportional valve, and the oil outlet of the proportional valve is connected to the drive oil access holes of the hydraulic actuators with no friction and zero leakage, respectively. The relief valves are set on the connection pipeline between the hydraulic pump 2 and the oil inlet, and the connection pipeline between the oil outlet and the drive oil access hole. The pressure sensor is used to obtain the pressure of each control cavity of the hydraulic actuators with no friction and zero leakage. The proportional valve and pressure sensors are connected with the controller. The controller is used to calculate the output displacement of the hydraulic actuators with no friction and zero leakage according to the pressure of the control cavity. The output displacement is compared with the commanded displacement to obtain the control signal. The proportional valve is controlled by the control signal.

The hydraulic pump 2 is driven by pump station motor 1 to output high-pressure oil.

The proportional valve is a proportional directional valve, a proportional pressure-reducing valve, a proportional relief valve, or a servo directional valve.

Two hydraulic actuators with no friction and zero leakage and two pressure sensors are provided, and the two outlets of the proportional valves are connected one by one with the two drive oil access holes.

Or four hydraulic actuators with no friction and zero leakage are provided, one outlet of the proportional valve is connected with two of the drive oil access holes, and the other outlet is connected with the other two drive oil access holes.

The hydraulic actuators with no friction and zero leakage are connected to a fixed bracket.

Or the hydraulic actuators with no friction and zero leakage are connected to a rotating platform through a ball hinge.

The following is the detailed description of the drive system for the hydraulic actuator with no friction and zero leakage disclosed in this embodiment.

Figure 6:
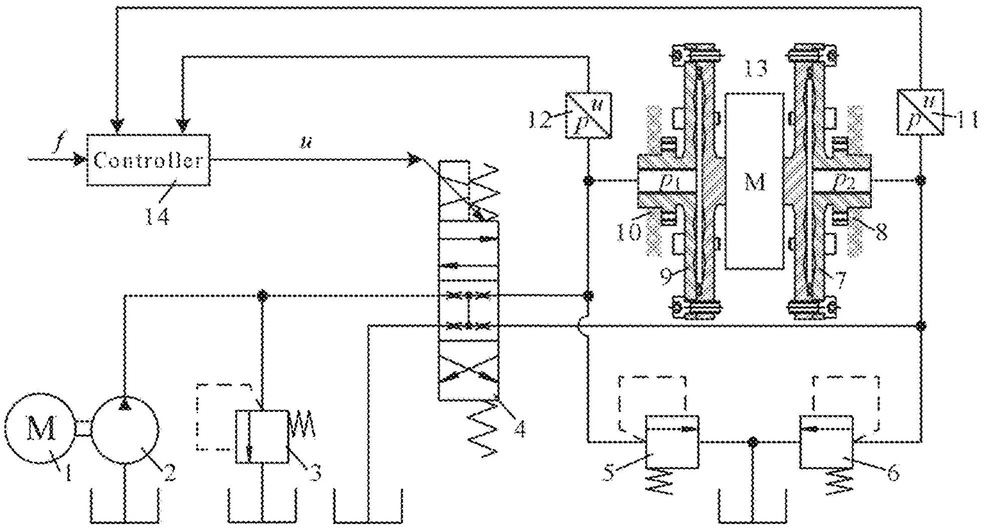
FIG. 6 is the schematic diagram of the first drive control loop of the open drive system disclosed in Embodiment 3.

As shown in FIG. 6, the proportional valve adopts the proportional directional valve 4, which includes two hydraulic actuators with no friction and zero leakage disclosed in Embodiment 1, which are disc actuator I 9 and disc actuator II 7, respectively. The hydraulic pump 2 is connected with the oil inlet of the proportional directional valve 4, and the oil outlet of the proportional directional valve 4 is connected with the drive oil access holes of the disc actuator I 9 and the disc actuator II 7, respectively. The relief valve 3 is set on the connection pipeline between the hydraulic pump 2 and the oil inlet, and the relief valve 5 is set on the connection pipeline between the oil outlet of the proportional directional valve 4 and the drive oil access hole of the disc actuator I 9. The relief valve 6 is set on the connecting pipe of another outlet of the proportional directional valve 4 and the drive oil access hole of the disc actuator II 7. The pressure sensor 12 is set to obtain the pressure of the disc actuator I 9 to control the cavity pressure, and the pressure sensor 11 is set to obtain the pressure of the disc actuator II 7 to control the cavity pressure. The proportional directional valve 4, and the pressure sensor 11 and 12 are connected with the controller 14. The controller 14 is used to calculate the output displacement of the disc actuator I 9 and the disc actuator II 7 according to the control cavity pressure obtained by the pressure sensors 11 and 12. The output displacement is compared with the commanded displacement to obtain the control signal, and the proportional directional valve 4 is controlled by the control signal.

Among them, the pump station motor 1 drives the hydraulic pump 2 to output high-pressure oil, the relief valve 3 controls the output pressure of the hydraulic pump 2, the proportional directional valve 4 controls the flow direction and flow rate of the high-pressure oil flowing into the disc actuator II 7 and the disc actuator I 9, the disc actuator II 7 is fixed with the fixed bracket II 8, the disc actuator I 9 is fixed with the fixed bracket I 10, the relief valve 5 limits the maximum value of the cavity pressure p1 of the disc actuator I 9, and the relief valve 6 limits the maximum value of the cavity pressure p2 of the disc actuator II 7; the pressure sensor 12 monitors the control cavity pressure p1 of the disc actuator I 9 in real time, the pressure sensor 11 monitors the control cavity pressure p2 the disc actuator II 7 in real time; the controller 14 calculates the real-time output displacement x=A1(p1−p2)/k1 according to the pressure signals p1 and p2 monitored by the pressure sensor 12 and 11, the overall stiffness k1 and the action area A1 of the disc actuator I 9 and the disc actuator II 7, and compares it with the command displacement f. The difference between the commanded displacement and the real-time displacement Δ=f−x is processed and the control signal u is output to the proportional directional valve 4. The control cavity pressure difference p1−p2 of the disc actuator I 9 and the disc actuator II 7 is changed by controlling the opening and direction of the proportional directional valve and the purpose of closed-loop control of the displacement of the driven platform 13 is realized. At this time, the driving force F=A1(p1−p2)/2 of the driven platform 13.

The proportional directional valve 4 can also be replaced by a proportional relief valve or a servo directional valve, and the oil circuit is the same as the above oil circuit.

Figure 7:
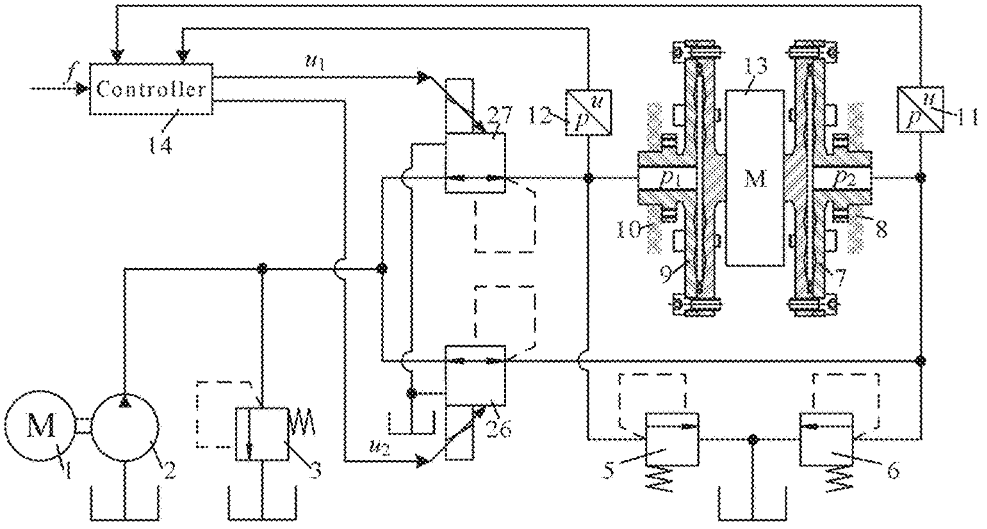
FIG. 7 is the schematic diagram of the second drive control loop of the open drive system disclosed in Embodiment 3.

As shown in FIG. 7, the proportional relief valves 26 and 27 can also be used instead of the proportional directional valve 4 to connect the hydraulic pump 2 with one end of the first tubing, the other end of the first tubing is connected with the second tubing and the third tubing respectively. The second tubing and the third tubing are connected with the inlets of the proportional relief valves 26 and 27 respectively. The outlet of the proportional relief valve 26 is connected with the drive oil access hole of the disc actuator H 7. The outlet of the proportional relief valve 27 is connected with the drive oil access hole of the disc actuator I 9. The relief valve 6 is set on the connection pipeline between the outlet of the proportional relief valve 26 and the drive oil access hole of the disc actuator II 7. The relief valve 5 is arranged on the connection pipeline between the oil outlet of the pressure-reducing valve 27 and the drive oil access hole of the disc actuator I 9, and the relief valve 3 is arranged on the first tubing.

Figure 8:
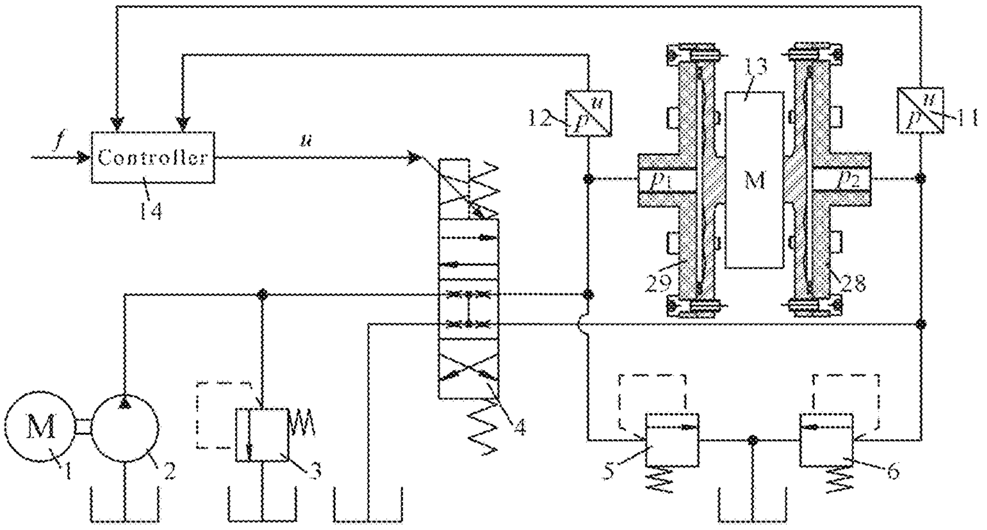
FIG. 8 is the schematic diagram of the third drive control loop of the open drive system disclosed in Embodiment 3.

When the axial size is tight, as shown in FIG. 8, the disc actuator I 9 and the disc actuator II 7 can be replaced by the hydraulic actuators with no friction and zero leakage with only groove A on the second end face of the thickened disc structure A, and the control cavity is formed by the groove A. The disc actuator I 29 and the disc actuator II 28.

Figure 9:
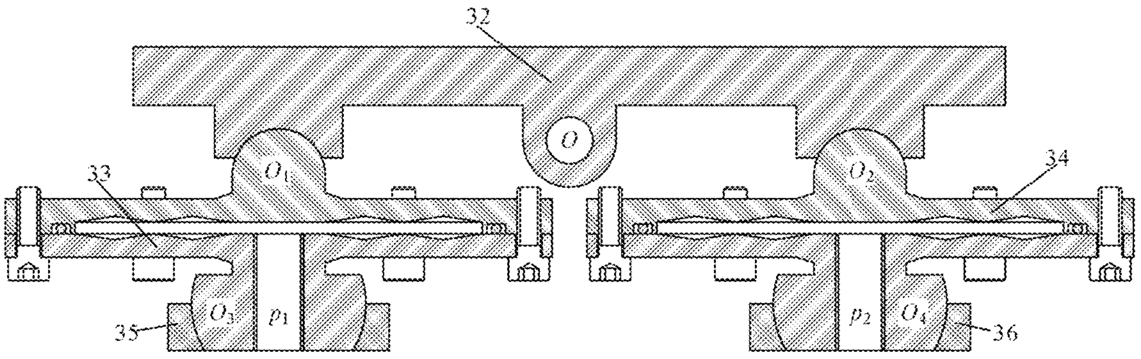
FIG. 9 is the schematic diagram of the rotary drive application disclosed in Example 3.

In the case of a rotating drive, as shown in FIG. 9, there are two hydraulic actuators with no friction and zero leakage disclosed in Embodiment 1, which are disc actuator I 33 and disc actuator II 34, respectively. The disc actuator I 33 is connected to the rotating platform 32 through the ball hinge O1, and it is connected to the fixed ball hinge I 35 through the ball hinge O3. The disc actuator II 34 is connected to the rotating platform 32 through the ball hinge O2, and it is connected to the fixed ball hinge II 36 through the ball hinge O4. The control cavity pressure p1 and p2 of the disc actuator I 3 and the disc actuator II 34 can realize the valve group control of the pressure closed-loop control through the proportional valves. The overall stiffness k3, the action area A3, and the arm of force L from O1 and O2 to O of the disc actuator I 33 and the disc actuator II 34 are known. Under the action of the pressure difference p1−p2 in the control cavity, the disc actuator I 33 and the dis actuator II 34 output displacements, and furthermore, the rotation angle of the rotating platform 32 around the axis O is α=arctan (A3(p1−p2)/(k3L)). According to the angle and the command angle, the control signal is output and the proportional valve is controlled by the control signal. Furthermore, the pressure difference p1−p2 of the control cavity of the disc actuator I 33 and the disc actuator II 34 is controlled to achieve the purpose of controlling the rotation angle of the rotating platform 32.

Figure 10:
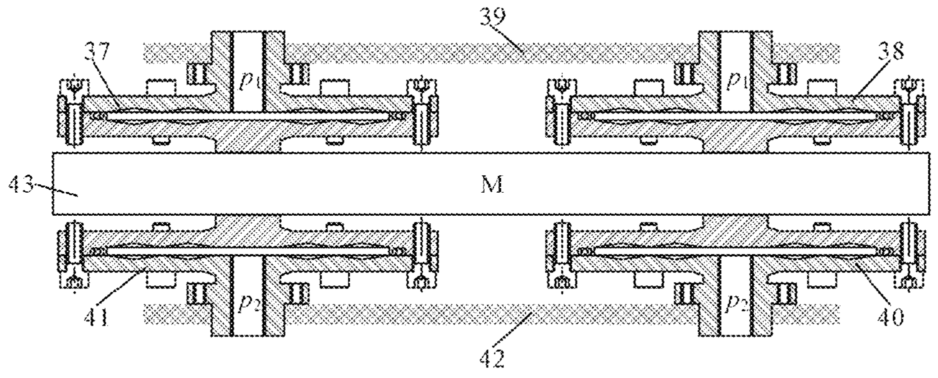
FIG. 10 is the schematic diagram of the multi-group parallel drive application disclosed in Embodiment 3.

When a large driving force is required, as shown in FIG. 10, four hydraulic actuators with no friction and zero leakage disclosed in Embodiment 1 are included, namely: disc actuator I 37, disc actuator II 38, disc actuator II 40, disc actuator IV 41.

Disc actuator I 37 and disc actuator II 38 are symmetrically arranged with disc actuator III 40 and disc actuator IV 41. Disc actuator I 37 and disc actuator II 38 are fixed with the fixed bracket I 39, the disc actuator III 40 and disc actuator IV 41 are fixed with the fixed bracket H 42, and the fixed bracket I 39 and the fixed bracket II 42 are fixed with each other. One outlet of the proportional valve is connected with the drive oil access hole of the disc actuator I 37 and the disc actuator II 38, and the other outlet is connected with the drive oil access hole of the disc actuator II 40 and the disc actuator IV 41. The internal control cavity pressure p1 of the disc actuator I 37 and disc actuator II 38, and the internal control cavity pressure p2 of the disc actuator III 40 and disc actuator IV 41 can realize the valve group control of pressure closed-loop control through the proportional valve; the overall stiffness k4 and the action area A4 of the disc actuator I 37 and the disc actuator Hi 38, and the disc actuator III 40 and the disc actuator IV 41 are known. Under the action of the pressure difference p1−p2 of the control cavity, the output displacement of the driven platform 43 is driven to output displacement x=A4(p1−p2)/k4. The output displacement is compared with the commanded displacement, and the control signal is output. The proportional valve is controlled by the control signal to control the displacement of the driven platform 43. At this time, the driving force of the driven platform 43 is F=A4 (p1−p2)/2.

The proportional valve is a proportional directional valve, a proportional pressure-reducing valve, a proportional relief valve, or a servo directional valve.

The drive system for the hydraulic actuator with no friction and zero leakage disclosed in this embodiment can realize high frequency and high precision displacement and force control of the hydraulic actuators with no friction and zero leakage using electro-hydraulic servo control.

Embodiment 4

In this embodiment, a drive system for the hydraulic actuator with no friction and zero leakage is disclosed, including a controller, a hydraulic pump, proportional valves, relief valves, a plurality of pressure sensors, and a plurality of hydraulic actuators with no friction and zero leakage disclosed in Embodiment 2. The hydraulic pump is connected to the oil inlet of the proportional valve, and the oil outlet of the proportional valve is connected to the oil access holes of the hydraulic actuators with no friction and zero leakage, respectively. The relief valves are set on the pipeline connecting the hydraulic pump and the oil inlet, and the pipeline connecting the oil outlet and the oil access hole. The pressure sensors are used to obtain the pressure in the control cavity of each hydraulic actuator with no friction and zero leakage. The controller is used to calculate the output displacement of the hydraulic actuators with no friction and zero leakage according to the pressure in the control cavity. The output displacement is compared with the commanded displacement to obtain the control signal, and the proportional valve is controlled by the control signal.

Figure 11:
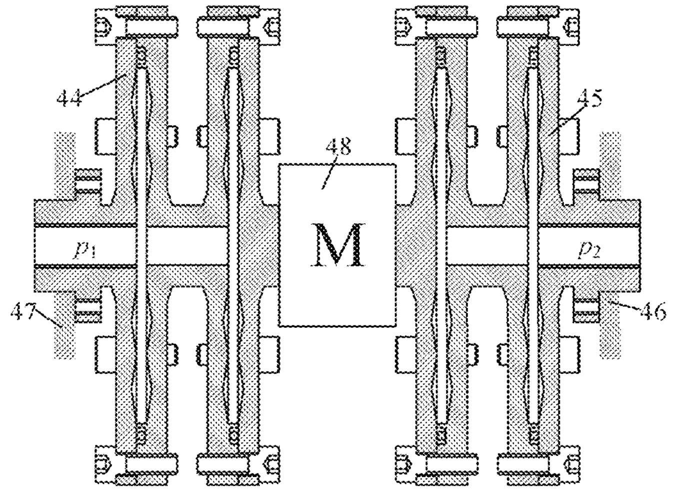
FIG. 11 is the schematic diagram of the multi-group series drive application disclosed in Embodiment 4.

The difference between this embodiment and Embodiment 3 is as follows: As shown in FIG. 11, the hydraulic actuator with no friction and zero leakage disclosed in Embodiment 1 and Embodiment 3 is replaced by the hydraulic actuator with no friction and zero leakage disclosed in Embodiment 2, which is a series disc actuator I 44 and a series disc actuator II 45, a series disc actuator I 44 and a series disc actuator II 45 symmetrically arranged, respectively, and they are fixed with the fixed bracket I 47 and the fixed bracket II 46, the fixed bracket I 47 and the fixed bracket II 46 are fixed with each other respectively. The control cavity pressure p1 and p2 of the series disc actuator I 44 and the series disc actuator II 45 can realize the valve group control of the pressure closed-loop control through the proportional valve, and the rest connections are the same as those of the embodiment 3. The overall stiffness k5 and the area A5 of the tandem disc actuator I 44 and the tandem disc actuator II 45 are known. Under the action of the pressure difference p1−p2 in the control cavity, the output displacement x=A5(p1−p2)/k5 of the driven platform 48 is driven. The output displacement is compared with the commanded displacement, and the control signal is output. The proportional valve is controlled by the control signal to control the displacement of the driven platform 48. At this time, the driving force F=A5(p1−p2)/2 of the driven platform 48.

The drive system for the hydraulic actuator with no friction and zero leakage disclosed in this embodiment can output large displacement through a series structure, which is suitable for use in scenarios requiring large strokes.

Finally, it shall be noted that the above embodiments are only used to explain the technical solution of the present invention and shall not be construed as a limitation thereto. Although the present invention is described in detail with reference to preferred embodiments, those of ordinary skill in the art shall understand that they still can modify or equivalently substitute the technical solution of the present invention. These modifications or equivalent substitutions do not deviate the modified technical solution from the spirit and scope of the technical solution of the present invention.

What is claimed:

1. A hydraulic actuator with no friction and zero leakage, comprising a first thickened disc structure and a second thickened disc structure; a second end face of the first thickened disc structure is connected to a first end face of the second thickened disc structure, and a control cavity is formed between the second end face of the first thickened disc structure and the first end face of the second thickened disc structure, a drive oil access hole is set on the second thickened disc structure, and the control cavity is connected with the drive oil access hole;

a convex platform is set on a first end face of the first thickened disc structure, and an installation flange is set on a second end face of the second thickened disc structure.

2. The hydraulic actuator with no friction and zero leakage according to claim 1, wherein the second end face of the first thickened disc structure and the first end face of the second thickened disc structure are sealed with a seal ring.

3. The hydraulic actuator with no friction and zero leakage according to claim 1, wherein the first thickened disc structure and the second thickened disc structure each comprise a plurality of stiffness weakening areas and a plurality of stiffness enhanced areas, the plurality of stiffness weakening areas and the plurality of stiffness enhanced areas are alternately arranged along a radial direction of the first thickened disc structure and the second thickened disc structure.

4. The hydraulic actuator with no friction and zero leakage according to claim 1, wherein a first groove is set on the second end face of the first thickened disc structure, the second end face of the first thickened disc structure is connected with the first end face of the second thickened disc structure, the control cavity is formed by the first groove.

5. The hydraulic actuator with no friction and zero leakage according to claim 1, wherein a first groove is set on the second end face of the first thickened disc structure, a second groove is set on the first end face of the second thickened disc structure, the second end face of the first thickened disc structure is connected with the first end face of the second thickened disc structure, the control cavity is formed by the first groove and the second groove.

6. A drive system for a hydraulic actuator with no friction and zero leakage comprising a controller, a hydraulic pump, a proportional valve, relief valves, a plurality of pressure sensors, and a plurality of hydraulic actuators with no friction and zero leakage according to claim 1;

the hydraulic pump is connected to an oil inlet of the proportional valve, and an oil outlet of the proportional valve is connected to the drive oil access holes of the plurality of hydraulic actuators with no friction and zero leakage, respectively;

the relief valves are set on a connection pipeline between the hydraulic pump and the oil inlet, and a connection pipeline between the oil outlet and the drive oil access hole;

the plurality of pressure sensors are configured to obtain a control cavity pressure of each of the plurality of hydraulic actuators with no friction and zero leakage;

the controller is configured to calculate an output displacement of the plurality of hydraulic actuators with no friction and zero leakage according to the control cavity pressure;

the output displacement is compared with a commanded displacement to obtain a control signal, the proportional valve is controlled by the control signal.

7. The drive system for the hydraulic actuator with no friction and zero leakage according to claim 6, wherein two hydraulic actuators with no friction and zero leakage and two pressure sensors are provided, two oil outlets of the proportional valves are connected one by one with two drive oil access holes.

8. The drive system for the hydraulic actuator with no friction and zero leakage according to claim 6, wherein four hydraulic actuators with no friction and zero leakage are provided, a first oil outlet of the proportional valve is connected with two of the drive oil access holes, and a second oil outlet is connected with the other two drive oil access holes.

9. The drive system for the hydraulic actuator with no friction and zero leakage according to claim 6, wherein the plurality of hydraulic actuators with no friction and zero leakage are connected to a fixed bracket.

10. The drive system for the hydraulic actuator with no friction and zero leakage according to claim 6, wherein the plurality of hydraulic actuators with no friction and zero leakage are connected to a rotating platform through a ball hinge.

11. The drive system according to claim 6, wherein in the hydraulic actuator, the second end face of the first thickened disc structure and the first end face of the second thickened disc structure are sealed with a seal ring.

12. The drive system according to claim 6, wherein in the hydraulic actuator, the first thickened disc structure and the second thickened disc structure each comprise a plurality of stiffness weakening areas and a plurality of stiffness enhanced areas, the plurality of stiffness weakening areas and the plurality of stiffness enhanced areas are alternately arranged along a radial direction of the first thickened disc structure and the second thickened disc structure.

13. The drive system according to claim 6, wherein in the hydraulic actuator, a first groove is set on the second end face of the first thickened disc structure, the second end face of the first thickened disc structure is connected with the first end face of the second thickened disc structure, the control cavity is formed by the first groove.

14. The drive system according to claim 6, wherein in the hydraulic actuator, a first groove is set on the second end face of the first thickened disc structure, a second groove is set on the first end face of the second thickened disc structure, the second end face of the first thickened disc structure is connected with the first end face of the sec on d thickened disc structure, the control cavity is formed by the first groove and the second groove.

15. A hydraulic actuator with no friction and zero leakage, comprising a disc actuator I and a disc actuator II;

the disc actuator I and the disc actuator II each comprise a first thickened disc structure and a second thickened disc structure;

a second end face of the first thickened disc structure is connected to a first end face of the second thickened disc structure, and a control cavity is formed between the second end face of the first thickened disc structure and the first end face of the second thickened disc structure;

the control cavity of the disc actuator I is connected to the control cavity of the disc actuator II, and a drive oil access hole is set on the second thickened disc structure of the disc actuator I; and the drive oil access hole is connected with the control cavity of the disc actuator I.

16. A drive system for a hydraulic actuator with no friction and zero leakage, comprising a controller, a hydraulic pump, a proportional valve, a relief valve, a plurality of pressure sensors, and a plurality of hydraulic actuators with no friction and zero leakage according to claim 15;

the hydraulic pump is connected with an oil inlet of the proportional valve, and an oil outlet of the proportional valve is connected with the drive oil access holes of the plurality of hydraulic actuators with no friction and zero leakage, the relief valves are set on a connection pipeline between the hydraulic pump and the oil inlet, and a connection pipeline between the oil outlet and the drive oil access hole;

the plurality of pressure sensors are configured to obtain a pressure in the control cavity of each of the plurality of hydraulic actuators with no friction and zero leakage;

the controller is configured to calculate an output displacement of the plurality of hydraulic actuators with no friction and zero leakage according to the pressure in the control cavity; and the output displacement is compared with a commanded displacement to obtain a control signal, and the proportional valve is controlled by the control signal.

* * * * *